United States Patent
Oguni et al.

(10) Patent No.: US 7,436,650 B2
(45) Date of Patent: Oct. 14, 2008

(54) LAMINATED CERAMIC CAPACITOR

(75) Inventors: Toshimi Oguni, Izumo (JP); Hiroyuki Matsumoto, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/948,698

(22) Filed: Nov. 30, 2007

(65) Prior Publication Data

US 2008/0084651 A1  Apr. 10, 2008

Related U.S. Application Data

(63) Continuation of application No. PCT/JP2006/311068, filed on Jun. 2, 2006.

(30) Foreign Application Priority Data

Jun. 3, 2005  (JP) .............................. 2005-164844
Jun. 1, 2006  (JP) .............................. 2006-153092

(51) Int. Cl.
  *H01G 4/06*  (2006.01)
(52) U.S. Cl. .................. 361/321.2; 361/321.1; 361/311; 361/313; 361/306.1; 361/306.3
(58) Field of Classification Search ............... 361/321.1, 361/321.2, 311–313, 303, 305, 306.1, 306.3, 361/308.1, 301.1, 301.4
See application file for complete search history.

(56) References Cited

U.S. PATENT DOCUMENTS 5,835,338 A   11/1998   Suzuki et al.

(Continued)

FOREIGN PATENT DOCUMENTS

JP   08-316086 A   11/1996

(Continued)

OTHER PUBLICATIONS

Official communication issued in the International Application No. PCT/JP2006/311068, mailed on Aug. 1, 2006.

(Continued)

*Primary Examiner*—Nguyen T Ha
(74) *Attorney, Agent, or Firm*—Keating & Bennett, LLP

(57) ABSTRACT

A laminated ceramic capacitor has a high breakdown voltage and excellent withstand-voltage performance, and prevents cracks generated during firing even when the number of lamination layers constituted by ceramic layers and inner electrode layers is increased. The laminated ceramic capacitor includes capacitance forming layers in which ceramic dielectric layers and capacitance-forming inner electrode layers are laminated, and a stress relieving layer. The stress relieving layer is disposed between the capacitance forming layers. In the stress relieving layer, ceramic dielectric layers, dummy inner electrode layers (split electrodes) that do not contribute to the formation of electrostatic capacitance, and capacitance-formation-preventing inner electrode layers that prevent capacitance from being formed between the capacitance-forming inner electrode layers and the dummy inner electrode layers are laminated. The thickness of the stress relieving layer is in the range of about 100 μm to about 300 μm inclusive. The plane area of the dummy inner electrode layers is about 60% or more of that of the capacitance-forming inner electrode layers. The dummy inner electrode layers are undivided or are divided into two or three parts in a single layer. With this structure, stress caused by electrostriction is relieved.

2 Claims, 9 Drawing Sheets

U.S. PATENT DOCUMENTS

| | | | |
|---|---|---|---|
| 6,052,272 A * | 4/2000 | Kuroda et al. | 361/303 |
| 6,331,929 B1 * | 12/2001 | Masuda | 361/303 |
| 6,418,009 B1 * | 7/2002 | Brunette | 361/306.3 |
| 6,519,134 B1 * | 2/2003 | Li et al. | 361/306.1 |
| 6,587,327 B1 * | 7/2003 | Devoe et al. | 361/306.3 |
| 7,224,570 B2 * | 5/2007 | Yamaguchi et al. | 361/305 |
| 7,339,781 B2 * | 3/2008 | Yoshii et al. | 361/309 |

FOREIGN PATENT DOCUMENTS

| | | |
|---|---|---|
| JP | 2000-226257 A | 8/2000 |
| JP | 2002-015940 A | 1/2002 |
| JP | 2002-075780 A | 3/2002 |
| JP | 2003-077754 A | 3/2003 |

OTHER PUBLICATIONS

Official communication issued in counterpart Japanese Application No. JP 2006-153092, mailed on Jan. 30, 2007.

Official communication issued in counterpart Japanese Application No. JP 2006-153092, mailed on Aug. 15, 2006.

* cited by examiner

NUMBER OF DIVISION OF DUMMY INNER ELECTRODE (POINT)

LAMINATED CERAMIC CAPACITOR

BACKGROUND OF THE INVENTION

1. Field of the Invention

The present invention relates to laminated ceramic capacitors, and in particular, relates to technologies of laminated ceramic capacitors of which structural defects such as cracks generated during firing while the laminated ceramic capacitors are produced or structural defects caused by electrostriction (inverse piezoelectric effect) can be controlled or prevented.

2. Description of the Related Art

As shown in FIG. 11, a typical laminated ceramic capacitor includes a plurality of inner electrode layers 53a and 53b that oppose each other with ceramic layers (dielectric layers) 52 disposed therebetween and a pair of outer electrodes 55a and 55b disposed at end surfaces 54a and 54b, respectively, of a ceramic element 51. Ends of the inner electrode layers 53a and 53b are alternately extended to the corresponding end surfaces so as to be electrically connected to the outer electrodes 55a and 55b, respectively.

When a dielectric with a high dielectric constant is used in such a laminated ceramic capacitor, stress is imposed on the ceramic dielectric layers due to electrostriction (inverse piezoelectric effect) that causes mechanical displacement by voltage. Furthermore, when the number of lamination layers constituted by the ceramic dielectric layers and the inner electrode layers is increased so that the capacity is increased, stress imposed on the entire laminated ceramic capacitor is increased. This leads to crack generation and a reduction in breakdown voltage or withstand voltage.

To solve this problem, as shown in FIG. 12, a laminated ceramic capacitor having an intermediate layer 62 being disposed between capacitance forming layers 61a and 61b for relieving stress caused by the inverse piezoelectric effect has been proposed so that breakdown voltage or withstand voltage does not drop to a lower value even when the number of lamination layers constituted by the ceramic dielectric layers and the inner electrode layers is increased (see Japanese Unexamined Patent Application Publication No. 9-180956). The capacitance forming layers 61a and 61b each have a lamination of the ceramic layers (dielectric layers) 52 and the inner electrode layers (capacitance-forming inner electrode layers) 53a and 53b that contribute to the formation of electrostatic capacitance.

In FIG. 12, components having the same reference numbers and symbols as shown in FIG. 11 indicate the same or corresponding components.

The capacitance forming layers having the inner electrode layers greatly contract during firing. On the other hand, the contraction rate of the intermediate layer 62 having no inner electrode layers is smaller than that of the capacitance forming layers. Therefore, when the thickness of the intermediate layer 62 having no inner electrode layers is too large in the above-described known laminated ceramic capacitor, stress becomes concentrated in the intermediate layer during firing, and causes, for example, a crack C in the intermediate layer 62 as shown in FIG. 13.

Since the thickness of the intermediate layer needs to be set such that crack generation in the intermediate layer due to contraction difference during firing is prevented while crack generation caused by electrostriction (inverse piezoelectric effect) is prevented, design flexibility is disadvantageously reduced.

In order to relieve the contraction difference generated between the capacitance forming layers having the inner electrode layers and the intermediate layer having no inner electrode layers during firing, additional inner electrode layers can be provided for the intermediate layer. A configuration having an intermediate layer including inner electrode layers that do not form capacitance is also described in Japanese Unexamined Patent Application Publication No. 9-180956.

However, the structure and the arrangement of the inner electrode layers need to be appropriately adjusted so as to effectively relieve the contraction difference generated between the capacitance forming layers and the intermediate layer, and desired effects are not easily produced in reality.

For example, when inner electrode layers forming no capacitance and divided into four parts are arranged in a single layer (in the same plane) as shown in FIG. 4 in Japanese Unexamined Patent Application Publication No. 9-180956, cracks are generated during heat treatment as described in the following explanations of preferred embodiments of the present invention.

SUMMARY OF THE INVENTION

In order to overcome the problems described above, preferred embodiments of the present invention provide a laminated ceramic capacitor having a high breakdown voltage and excellent withstand-voltage performance, in which structural defects such as cracks generated during firing or structural defects caused by electrostriction (inverse piezoelectric effect) can be prevented even when a ceramic material with a high dielectric constant is used as a dielectric ceramic and even when the number of lamination layers constituted by ceramic dielectric layers and capacitance-forming inner electrode layers is increased.

According to a preferred embodiment of the present invention, a laminated ceramic capacitor includes at least two capacitance forming layers in which at least one ceramic dielectric layer and capacitance-forming inner electrode layers that contribute to the formation of electrostatic capacitance are laminated; at least one stress relieving layer in which ceramic dielectric layers and at least one dummy inner electrode layer that does not contribute to the formation of electrostatic capacitance are laminated, the stress relieving layer being disposed between two adjacent capacitance forming layers so as to relieve stress caused by electrostriction in the capacitance forming layers; and capacitance-formation-preventing inner electrode layers that prevent capacitance from being formed between the capacitance-forming inner electrode layers and the dummy inner electrode layer, each of the capacitance-formation-preventing inner electrode layers being disposed between each of the capacitance forming layers and the stress relieving layer.

In the laminated ceramic capacitor, it is preferable that the thickness of the stress relieving layer is in the range of about 100 μm to about 300 μm inclusive, the plane area of the dummy inner electrode layer in a single layer is about 60% or more of the plane area of the capacitance-forming inner electrode layer in a single layer, and the dummy inner electrode layer is undivided or is divided into two or three parts in a single layer.

The ceramic dielectric material of which the stress relieving layer is made preferably is the same ceramic dielectric material as the ceramic dielectric material of which the capacitance forming layers are made.

The laminated ceramic capacitor preferably includes at least two capacitance forming layers in which at least one ceramic dielectric layer and capacitance-forming inner electrode layers that contribute to the formation of electrostatic capacitance are laminated; at least one stress relieving layer in which ceramic dielectric layers and at least one dummy inner electrode layer that does not contribute to the formation of electrostatic capacitance are laminated, the stress relieving layer being disposed between the capacitance forming layers so as to relieve stress caused by electrostriction in the capacitance forming layers; and capacitance-formation-preventing inner electrode layers that prevent capacitance from being formed between the capacitance-forming inner electrode layers and the dummy inner electrode layer, each of the capacitance-formation-preventing inner electrode layers being disposed between each of the capacitance forming layers and the stress relieving layer. The thickness of the stress relieving layer preferably is in the range of about 100 μm to about 300 μm inclusive. The plane area of the dummy inner electrode layer in a single layer (the plane area of the dummy inner electrode layer existing in the same plane) preferably is about 60% or more of the plane area of the capacitance-forming inner electrode layer in a single layer. The dummy inner electrode layer preferably is undivided or is divided into two or three parts in a single layer. With this, a laminated ceramic capacitor, with a high breakdown voltage and excellent withstand-voltage performance, in which structural defects such as cracks generated during firing or structural defects caused by electrostriction (inverse piezoelectric effect) can be prevented even when a ceramic material with a high dielectric constant is used as a dielectric ceramic and even when the number of lamination layers constituted by the ceramic dielectric layers and the capacitance-forming inner electrode layers is increased can be realized.

That is, since the thickness of the stress relieving layer preferably is in the range of about 100 μm to about 300 μm inclusive; the stress relieving layer includes the dummy inner electrode layer, and the plane area of the dummy inner electrode layer in a single layer preferably is about 60% or more of the plane area of the capacitance-forming inner electrode layer in a single layer; and the dummy inner electrode layer preferably is undivided or is divided into two or three parts in a single layer, structural defects such as cracks generated due to the contraction difference in the inner electrode layers and the ceramic dielectric layer during firing can be prevented, and stress generated by electrostriction (inverse piezoelectric effect) can be absorbed and relieved even when the number of lamination layers constituted by the ceramic dielectric layer and the capacitance-forming inner electrode layers is increased. Thus, a laminated ceramic capacitor with a high breakdown voltage and excellent withstand-voltage performance can be realized.

According to a preferred embodiment of the present invention, the thickness of the stress relieving layer is preferably in the range of about 100 μm to about 300 μm inclusive. When the thickness of the stress relieving layer is less than about 100 μm, stress caused by electrostriction (inverse piezoelectric effect) when the number of lamination layers constituted by the ceramic dielectric layer and the capacitance-forming inner electrode layers is increased is not sufficiently relieved. When the thickness exceeds about 300 μm, the thickness of the product is increased and inhibits a reduction in the size of the product.

According to a preferred embodiment of the present invention, the plane area of the dummy inner electrode layer in a single layer is about 60% or more of that of the capacitance-forming inner electrode layer in a single layer. When the ratio is about 60% or more, the contraction difference between the electrostatic-capacitance forming layers and the stress relieving layer during firing can be reduced, and cracks can be prevented from being generated between the electrostatic-capacitance forming layers and the stress relieving layer.

When the ratio is less than about 60%, the effect of reducing the contraction difference between the electrostatic-capacitance forming layers and the stress relieving layer during firing is reduced, and the possibility of crack generation between the electrostatic-capacitance forming layers and the stress relieving layer can be increased.

According to a preferred embodiment of the present invention, the dummy inner electrode layer preferably is divided into two or three parts (split electrodes) in a single layer. As a result, crack generation during firing due to the contraction difference between the inner electrode layers and the ceramic dielectric layers can be prevented more reliably.

When the dummy inner electrode layer is undivided in a single layer, crack generation during firing due to the contraction difference between the inner electrode layer and the ceramic dielectric layers can also be effectively prevented in the case where the thickness of the stress relieving layer and the ratio of the plane area of the dummy inner electrode layer in a single layer to that of the capacitance-forming inner electrode layer in a single layer satisfy the above-described requirements of preferred embodiments of the present invention.

Moreover, when the ceramic dielectric material of which the stress relieving layer is made is the same ceramic dielectric material as the ceramic dielectric material of which the capacitance forming layers are made, affinity between the capacitance forming layers and the stress relieving layer can be ensured, and crack generation during firing due to the contraction difference between the inner electrode layers and the ceramic dielectric layers can be prevented more reliably. Thus, preferred embodiments of the present invention can be more effective.

According to a preferred embodiment of the present invention, the ceramic dielectric material of which the stress relieving layer is made is preferably the same ceramic dielectric material as the ceramic dielectric material of which the capacitance forming layers are made as described above. However, a different type of ceramic dielectric material can also be used for the stress relieving layer. In that case, the ceramic dielectric material desirably has physical properties similar to those of the ceramic dielectric material of which the capacitance forming layers are made.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Features of the present invention will now be described in detail with reference to preferred embodiments thereof.

Figure 1:
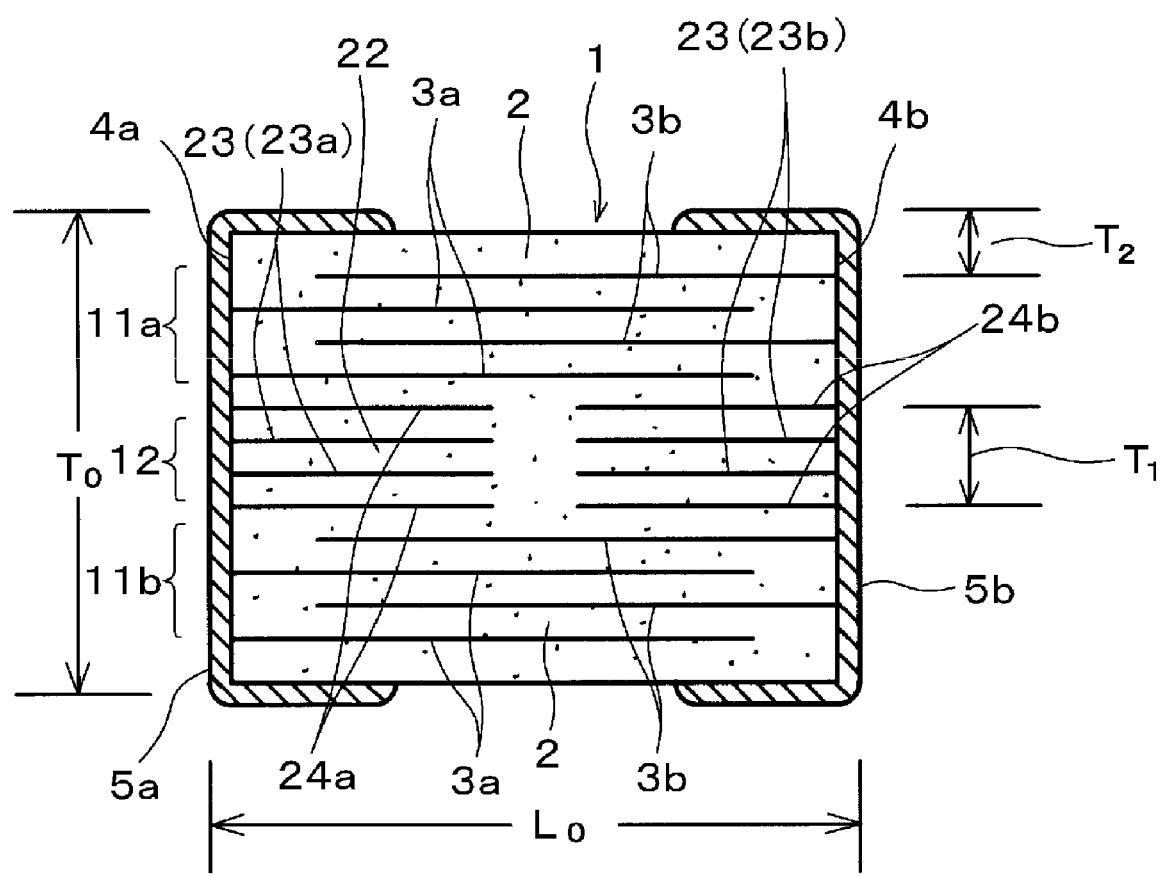
FIG. 1 is a cross-sectional view schematically illustrating the structure of a laminated ceramic capacitor according to a preferred embodiment of the present invention.
Figure 2:
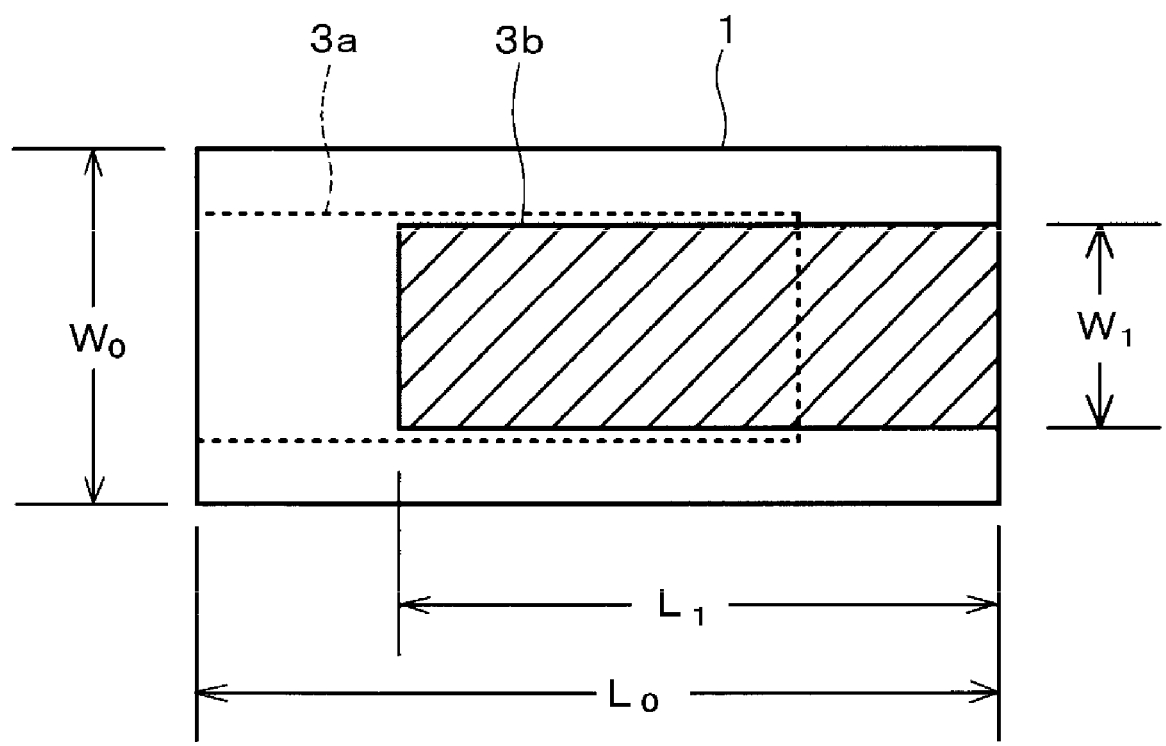
FIG. 2 is a plan view illustrating the structure of capacitance-forming inner electrode layers disposed in capacitance forming layers of the laminated ceramic capacitor according to a preferred embodiment of the present invention.
Figure 3:
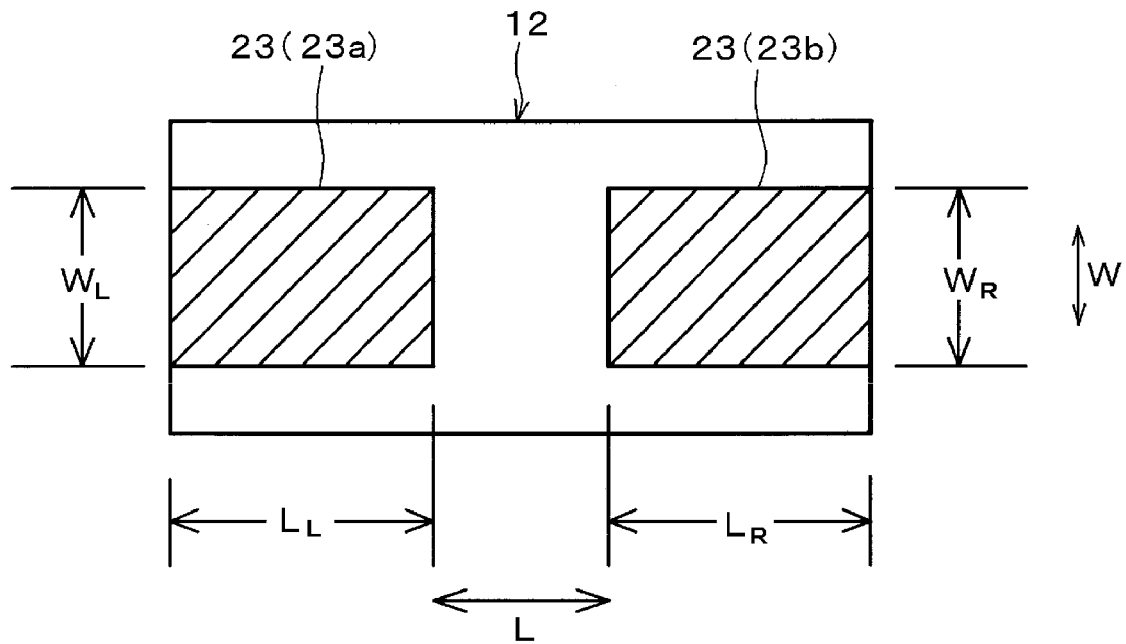
FIG. 3 is a plan view illustrating the structure of dummy inner electrode layers disposed in a stress relieving layer (intermediate layer) of the laminated ceramic capacitor according to a preferred embodiment of the present invention.

FIG. 1 is a cross-sectional view schematically illustrating the structure of a laminated ceramic capacitor according to a preferred embodiment of the present invention. FIG. 2 is a plan view illustrating capacitance-forming inner electrode layers disposed in capacitance forming layers of the laminated ceramic capacitor shown in FIG. 1. FIG. 3 is a plan view illustrating dummy inner electrode layers disposed in a stress relieving layer (intermediate layer) of the laminated ceramic capacitor shown in FIG. 1.

As shown in FIG. 1, a laminate (ceramic element) 1 constituting the laminated ceramic capacitor according to the first preferred embodiment includes a pair of capacitance forming layers 11a and 11b and a stress relieving layer (intermediate layer) 12 disposed between the pair of capacitance forming layers 11a and 11b. Each of the capacitance forming layers 11a and 11b includes a lamination of ceramic dielectric layers 2 and capacitance-forming inner electrode layers 3a and 3b that contribute to the formation of electrostatic capacitance. The stress relieving layer (intermediate layer) 12 includes a lamination of ceramic dielectric layers 22 and dummy inner electrode layers 23 (split electrodes 23a and 23b) that do not contribute to the formation of electrostatic capacitance.

Furthermore, the laminate (ceramic element) 1 includes capacitance-formation-preventing inner electrode layers 24a and 24b that prevent capacitance from being formed between the capacitance-forming inner electrode layers 3a and 3b that contribute to the formation of electrostatic capacitance and the dummy inner electrode layers 23 (split electrodes 23a and 23b). The capacitance-formation-preventing inner electrode layers 24a and 24b are disposed between the capacitance forming layer 11a and the stress relieving layer (intermediate layer) 12 and between the stress relieving layer (intermediate layer) 12 and the capacitance forming layer 11b, respectively.

Moreover, outer electrodes 5a and 5b are disposed at end surfaces 4a and 4b, respectively, of the laminate (ceramic element) 1 including the capacitance forming layers 11a and 11b and the stress relieving layer (intermediate layer) 12.

In the capacitance forming layers 11a and 11b, a ceramic material primarily made of a $BaTiO_3$ based ceramic with a high dielectric constant preferably is used for the ceramic dielectric layers 2.

Moreover, a material primarily made of a $BaTiO_3$ based ceramic with a high dielectric constant preferably is used for the ceramic dielectric layers 22 constituting the stress relieving layer (intermediate layer) 12 as are the ceramic dielectric layers 2 constituting the capacitance forming layers 11a and 11b.

In the capacitance forming layers 11a and 11b, the capacitance-forming inner electrode layers 3a and 3b are formed of electrodes that are made of Ni. In the stress relieving layer (intermediate layer) 12, the dummy inner electrode layers 23 (split electrodes 23a and 23b) are also formed of electrodes that are made of Ni.

Moreover, the capacitance-formation-preventing inner electrode layers 24a and 24b that prevent capacitance from being formed between the capacitance-forming inner electrode layers 3a and 3b and the dummy inner electrode layers 23 (split electrodes 23a and 23b) are also formed of electrodes that are made of Ni.

Sample dimensions of components and conditions of the laminated ceramic capacitor according to the first preferred embodiment are shown below.

Length (L0): 1.6 mm
Width (W0): 0.8 mm
Thickness (T0): 0.8 mm
Thickness of each ceramic layer (dielectric layer): 7.1 μm
Thickness of each outer layer (T2): 70 μm
Dimensions of the capacitance-forming inner electrode layers in the capacitance forming layers
Length (L1): 1.34 mm
Width (W1): 0.51 mm
Total number of ceramic layers laminated in the capacitance forming layers: 60
Thickness of the stress relieving layer (T1): 0 to 300 μm Structural defects in 144 samples (n=144) for each design structure shown in evaluation matrices in Tables 1 to 4 were examined before and after a treatment of 150° C.—3 WV (voltage three times as large as rated working voltage)—60 min using an ultrasonic flaw detector.

Herein, structural defects generated before the treatment of 150° C.—3 WV—60 min were those generated due to contraction difference during firing.

Moreover, structural defects generated after the treatment of 150° C.—3 WV—60 min were those caused by electrostriction (inverse piezoelectric effect).

The treatment of 150° C.—3 WV—60 min was applied to samples excluding those already having structural defects before applying the treatment (i.e., those having structural defects generated due to the contraction difference during firing).

The incidence of structural defects after the treatment in Tables 1 to 4 is the ratio of the number of samples having structural defects among the samples excluding those having structural defects generated due to the contraction difference during firing from the samples (144) to the total number of samples (144).

The following matters were checked for each design condition in Evaluations 1 to 31 shown in Tables 1 to 4.

(1) Evaluations 1 to 7

In Evaluations 1 to 7, the relationship between the thickness of the intermediate layer and the incidence of structural defects when the stress relieving layer (intermediate layer) included no dummy inner electrode layers that did not contribute to the formation of electrostatic capacitance was examined (comparative examples).

(2) Evaluations 8 to 14

In Evaluations 8 to 14, the relationship between the thickness of the intermediate layer and the incidence of structural defects when the stress relieving layer (intermediate layer) included the dummy inner electrode layers 23 was examined.

(3) Evaluations 15 to 19

In Evaluations 15 to 19, the relationship between the plane area of the dummy inner electrode layers 23 in a single layer and the incidence of structural defects, that is, the relationship between the plane area of the dummy inner electrode layers 23 and the incidence of structural defects when the plane area of the dummy inner electrode layers 23 was changed by changing the dimension in an L direction (LL) of the split electrode 23a at the left side in FIG. 3 and the dimension in the L direction (LR) of the split electrode 23b at the right side was examined.

(4) Evaluations 20 to 23

In Evaluations 20 to 23, the relationship between the plane area of the dummy inner electrode layers 23 in a single layer and the incidence of structural defects, that is, the relationship between the plane area of the dummy inner electrode layers 23 and the incidence of structural defects when the plane area of the dummy inner electrode layers 23 was changed by changing the dimension in a W direction (WL) of the split electrode 23a at the left side in FIG. 3 and the dimension in the W direction (WR) of the split electrode 23b at the right side was examined.

(5) Evaluations 24 to 27

In Evaluations 24 to 27, the relationship between the plane area of the dummy inner electrode layers 23 in a single layer and the incidence of structural defects, that is, the relationship between the plane area of the dummy inner electrode layers 23 and the incidence of structural defects when the plane area of the dummy inner electrode layers 23 was changed by changing the dimensions in both the L and W directions (LL and WL) of the split electrode 23a at the left side in FIG. 3 and the dimensions in both the L and W directions (LR and WR) of the split electrode 23b at the right side in FIG. 3 was examined.

(6) Evaluations 28 and 29

In Evaluations 28 and 29, the incidence of structural defects when the arrangement pattern of the dummy inner electrode layers 23 in a single layer (in the same plane) was changed while the total plane area of the dummy inner electrode layers 23 was not changed was examined. That is, the incidence of structural defects when the dummy inner electrode layers 23 were divided into two split electrodes 23a and 23b having different dimensions in the L direction shown in FIG. 3 was examined in Evaluation 28. Moreover, the incidence of structural defects when the dummy inner electrode layers 23 were undivided as shown in FIG. 4 was examined in Evaluation 29.

Figure 4:
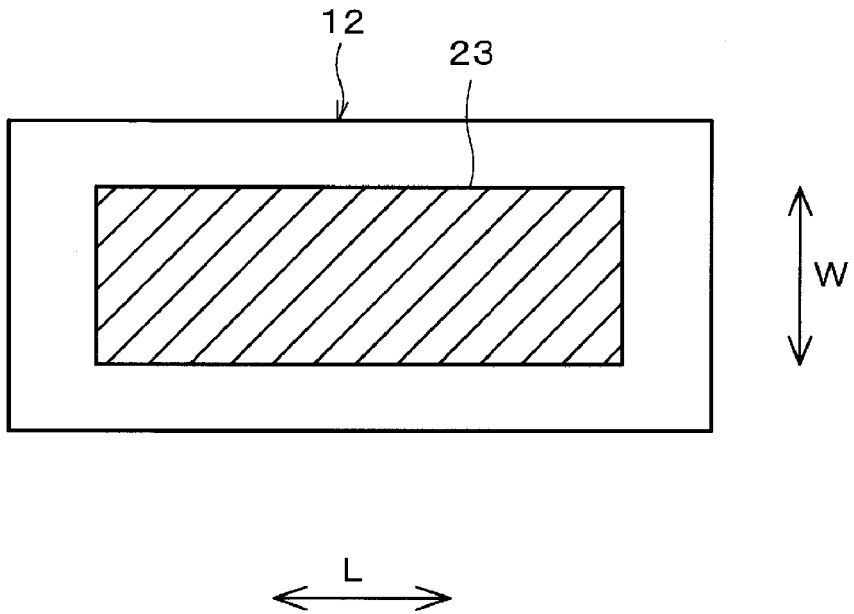
FIG. 4 illustrates an undivided dummy inner electrode layer disposed in the stress relieving layer (intermediate layer) of the laminated ceramic capacitor according to a preferred embodiment of the present invention.

In Evaluation 29, only one dummy inner electrode layer 23 was disposed in the center of the stress relieving layer (intermediate layer) 12 as shown in FIG. 4. Thus, the number of divisions is zero.

(7) Evaluations 30 and 31

Evaluations 30 and 31 examined the relationship between the number of divisions of the dummy inner electrode layers 23 in a single layer and the incidence of structural defects.

Figure 5:
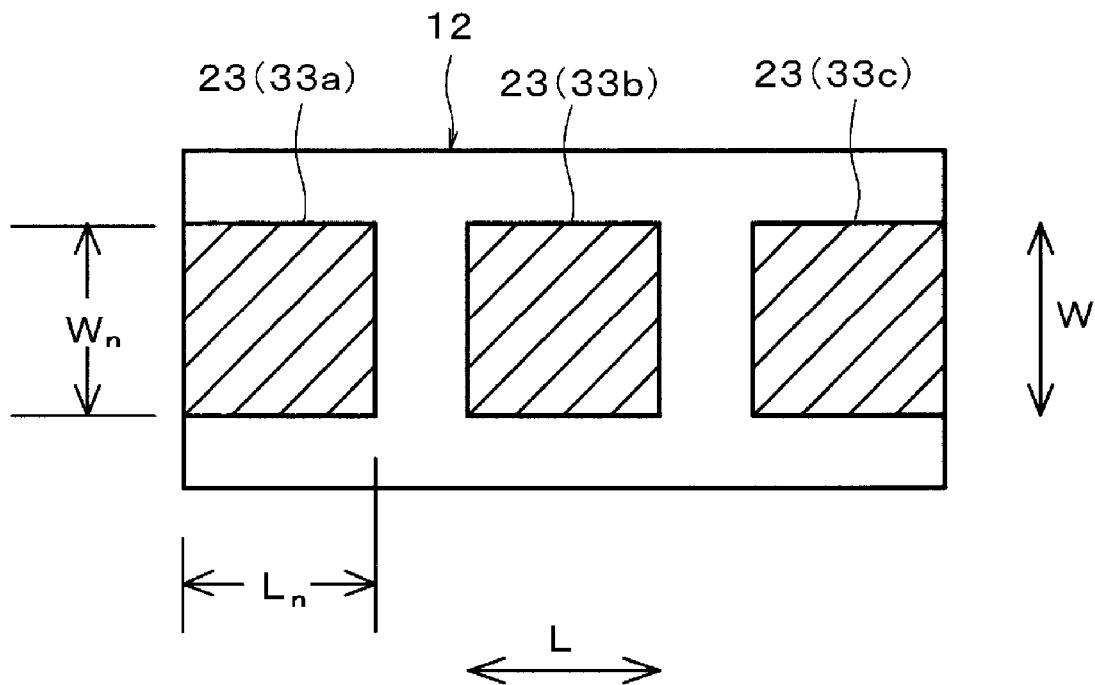
FIG. 5 illustrates three split electrodes divided in an L direction constituting a dummy inner electrode layer, the split electrodes being disposed in the stress relieving layer (intermediate layer) of the laminated ceramic capacitor according to a preferred embodiment of the present invention.
Figure 6:
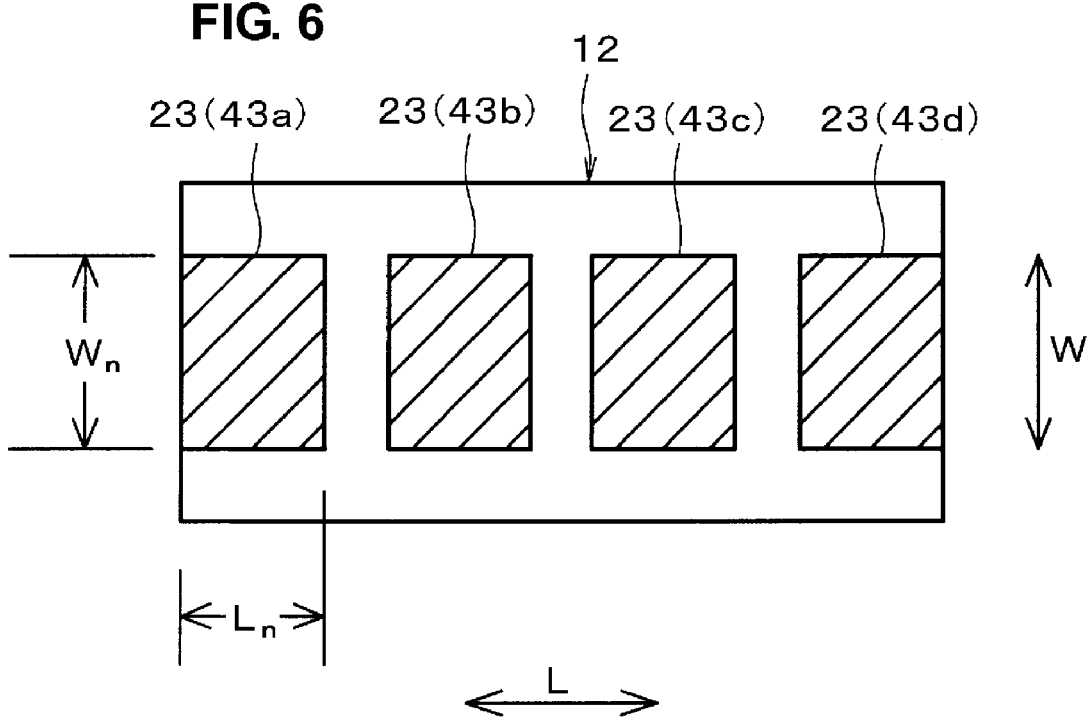
FIG. 6 illustrates four split electrodes divided in the L direction constituting a dummy inner electrode layer, the split electrodes being disposed in the stress relieving layer (intermediate layer).

In Evaluations 8 to 28 shown in Tables 2 to 4, the dummy inner electrode layers 23 were divided into two parts as shown in FIG. 3. In Evaluation 30 shown in Table 4, the dummy inner electrode layers 23 were divided into three split electrodes 33a, 33b, and 33c (split positions: two) in the L direction as shown in FIG. 5. In Evaluation 31, the dummy inner electrode layers 23 were divided into four split electrodes 43a, 43b, 43c, and 43d (split positions: three) in the L direction as shown in FIG. 6. In Evaluation 29, the dummy inner electrode layers 23 were undivided (split positions: zero).

Results of evaluating the characteristics of the samples are shown in Tables 1 to 4.

TABLE 1

| | Stress relieving layer (intermediate layer) | | Dummy inner electrode | | | | Incidence of structural defects (%) | |
|---|---|---|---|---|---|---|---|---|
| | Thickness (μm) | Presence of dummy inner electrode | Dimensions of split electrode at left in FIG. 3 (L × W) (mm) | Dimensions of split electrode at right in FIG. 3 (L × W) (mm) | Area ratio with respect to capacitance-forming inner electrode (%) | Number of divisions (number of split positions) | During heat treatment (%) | Caused by electrostriction (%) |
| Evaluation 1 | 0 | No | — | — | — | — | 0 | 27 |
| Evaluation 2 | 25 | No | — | — | — | — | 0 | 19 |
| Evaluation 3 | 50 | No | — | — | — | — | 0 | 10 |
| Evaluation 4 | 100 | No | — | — | — | — | 0 | 5 |
| Evaluation 5 | 150 | No | — | — | — | — | 2 | 0 |
| Evaluation 6 | 200 | No | — | — | — | — | 4 | 0 |
| Evaluation 7 | 300 | No | — | — | — | — | 13 | 0 |

TABLE 2

| | Stress relieving layer (intermediate layer) | | Dummy inner electrode | | | | Incidence of structural defects (%) | |
|---|---|---|---|---|---|---|---|---|
| | Thickness (μm) | Presence of dummy inner electrode | Dimensions of split electrode at left in FIG. 3 (L × W) (mm) | Dimensions of split electrode at right in FIG. 3 (L × W) (mm) | Area ratio with respect to capacitance-forming inner electrode (%) | Number of divisions (number of split positions) | During heat treatment (%) | Caused by electrostriction (%) |
| Evaluation 8 | 14 | Yes (1 layer) | 0.60 × 0.51 | 0.60 × 0.51 | 90 | 2 (1) | 0 | 22 |
| Evaluation 9 | 25 | Yes (2 layers) | 0.60 × 0.51 | 0.60 × 0.51 | 90 | 2 (1) | 0 | 15 |
| Evaluation 10 | 50 | Yes (6 layers) | 0.60 × 0.51 | 0.60 × 0.51 | 90 | 2 (1) | 0 | 7 |
| Evaluation 11 | 100 | Yes (13 layers) | 0.60 × 0.51 | 0.60 × 0.51 | 90 | 2 (1) | 0 | 0 |
| Evaluation 12 | 150 | Yes (20 layers) | 0.60 × 0.51 | 0.60 × 0.51 | 90 | 2 (1) | 0 | 0 |
| Evaluation 13 | 200 | Yes (27 layers) | 0.60 × 0.51 | 0.60 × 0.51 | 90 | 2 (1) | 0 | 0 |
| Evaluation 14 | 300 | Yes (41 layers) | 0.60 × 0.51 | 0.60 × 0.51 | 90 | 2 (1) | 0 | 0 |

TABLE 3

| | Stress relieving layer (intermediate layer) | | Dummy inner electrode | | | | Incidence of structural defects (%) | |
|---|---|---|---|---|---|---|---|---|
| | Thickness (μm) | Presence of dummy inner electrode | Dimensions of split electrode at left in FIG. 3 (L × W) (mm) | Dimensions of split electrode at right in FIG. 3 (L × W) (mm) | Area ratio with respect to capacitance-forming inner electrode (%) | Number of divisions (number of split positions) | During heat treatment (%) | Caused by electrostriction (%) |
| Evaluation 15 | 300 | Yes (41 layers) | 0.45 × 0.51 | 0.45 × 0.51 | 67 | 2 (1) | 0 | 0 |
| Evaluation 16 | 300 | Yes (41 layers) | 0.40 × 0.51 | 0.40 × 0.51 | 60 | 2 (1) | 0 | 0 |
| Evaluation 17 | 300 | Yes (41 layers) | 0.30 × 0.51 | 0.30 × 0.51 | 45 | 2 (1) | 3 | 0 |
| Evaluation 18 | 300 | Yes (41 layers) | 0.15 × 0.51 | 0.15 × 0.51 | 22 | 2 (1) | 9 | 0 |
| Evaluation 19 | 300 | Yes (41 layers) | 0.05 × 0.51 | 0.05 × 0.51 | 7 | 2 (1) | 12 | 0 |
| Evaluation 20 | 300 | Yes (41 layers) | 0.60 × 0.38 | 0.60 × 0.38 | 67 | 2 (1) | 0 | 0 |
| Evaluation 21 | 300 | Yes (41 layers) | 0.60 × 0.26 | 0.60 × 0.26 | 45 | 2 (1) | 1 | 0 |
| Evaluation 22 | 300 | Yes (41 layers) | 0.60 × 0.13 | 0.60 × 0.13 | 22 | 2 (1) | 4 | 0 |
| Evaluation 23 | 300 | Yes (41 layers) | 0.60 × 0.05 | 0.60 × 0.05 | 9 | 2 (1) | 10 | 0 |

TABLE 4

| | Stress relieving layer (intermediate layer) | | Dummy inner electrode | | | | Incidence of structural defects (%) | |
|---|---|---|---|---|---|---|---|---|
| | Thickness (μm) | Presence of dummy inner electrode | Dimensions of split electrode at left in FIG. 3 (L × W) (mm) | Dimensions of split electrode at right in FIG. 3 (L × W) (mm) | Area ratio with respect to capacitance-forming inner electrode (%) | Number of divisions (number of split positions) | During heat treatment (%) | Caused by electrostriction (%) |
| Evaluation 24 | 300 | Yes (41 layers) | 0.54 × 0.38 | 0.54 × 0.38 | 60 | 2 (1) | 0 | 0 |
| Evaluation 25 | 300 | Yes (41 layers) | 0.45 × 0.38 | 0.45 × 0.38 | 50 | 2 (1) | 1 | 0 |
| Evaluation 26 | 300 | Yes (41 layers) | 0.30 × 0.26 | 0.30 × 0.26 | 23 | 2 (1) | 10 | 0 |

TABLE 4-continued

| | Stress relieving layer (intermediate layer) | | Dummy inner electrode | | | | Incidence of structural defects (%) | |
|---|---|---|---|---|---|---|---|---|
| | Thickness (μm) | Presence of dummy inner electrode | Dimensions of split electrode at left in FIG. 3 (L x W) (mm) | Dimensions of split electrode at right in FIG. 3 (L x W) (mm) | Area ratio with respect to capacitance-forming inner electrode (%) | Number of divisions (number of split positions) | During heat treatment (%) | Caused by electrostriction (%) |
| Evaluation 27 | 300 | Yes (41 layers) | 0.15 x 0.13 | 0.15 x 0.13 | 6 | 2 (1) | 13 | 0 |
| Evaluation 28 | 300 | Yes (41 layers) | 0.20 x 0.51 | 0.60 x 0.51 | 60 | 2 (1) | 0 | 0 |
| Evaluation 29 | 300 | Yes (41 layers) | Dimensions of undivided electrode 0.80 x 0.51 (FIG. 4) | | 60 | undivided (0) | 0 | 0 |
| Evaluation 30 | 300 | Yes (41 layers) | Dimensions of each part of electrode divided into three 0.40 x 0.51 (x3) (FIG. 5) | | 90 | 3 (2) | 0 | 0 |
| Evaluation 31 | 300 | Yes (41 layers) | Dimensions of each part of electrode divided into four 0.30 x 0.51 (x4) (FIG. 6) | | 90 | 4 (3) | 5 | 0 |

(1) Evaluations 1 to 7

Figure 7:
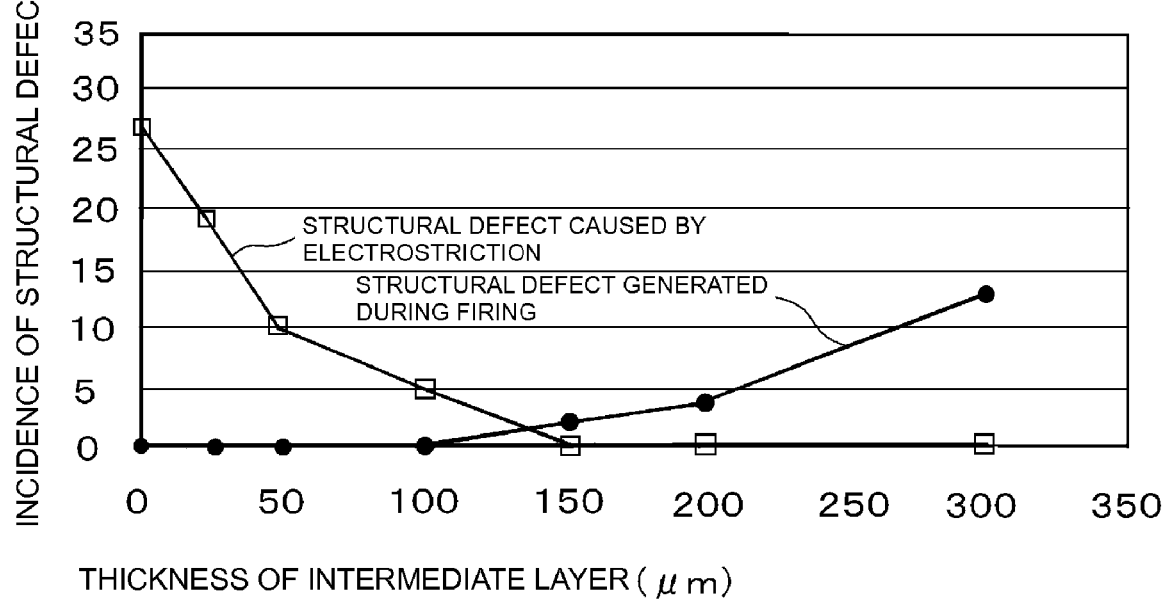
FIG. 7 illustrates the relationship between the thickness of the intermediate layer and the incidence of structural defects when the stress relieving layer (intermediate layer) does not include the dummy inner electrode layers.

In Evaluations 1 to 7 shown in Table 1 where the stress relieving layer (intermediate layer) did not include the dummy inner electrode layers 23, structural defects were generated due to electrostriction (inverse piezoelectric effect) when the thickness of the intermediate layer was about 100 μm or less (Evaluations 1 to 4), and were generated due to the contraction difference during firing when the thickness of the intermediate layer was about 150 μm or more (Evaluations 5, 6, and 7; see FIG. 7).

Evaluations 1 to 7 proved that satisfactory results were not achieved when the intermediate layer did not include the dummy inner electrode layers 23.

(2) Evaluations 8 to 14

Figure 8:
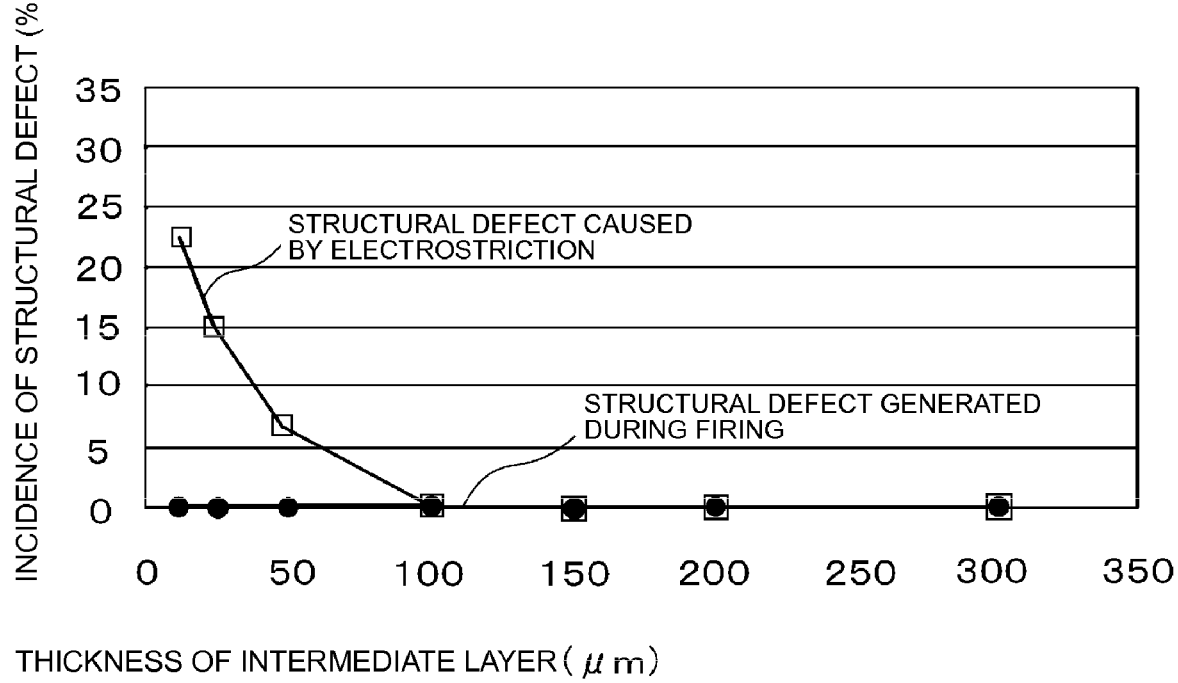
FIG. 8 illustrates the relationship between the thickness of the intermediate layer and the incidence of structural defects when the stress relieving layer (intermediate layer) includes the dummy inner electrode layers.

In Evaluations 8 to 14 shown in Table 2 where the stress relieving layer (intermediate layer) included the dummy inner electrode layers 23 and the number of divisions was two, structural defects were generated due to electrostriction (inverse piezoelectric effect) when the thickness of the intermediate layer was less than about 100 μm. However, no structural defects were generated due to the contraction difference during firing and due to electrostriction (inverse piezoelectric effect) when the thickness of the intermediate layer was in the range of about 100 μm to about 300 μm inclusive (see FIG. 8).

(3) Evaluations 15 to 19

Figure 9:
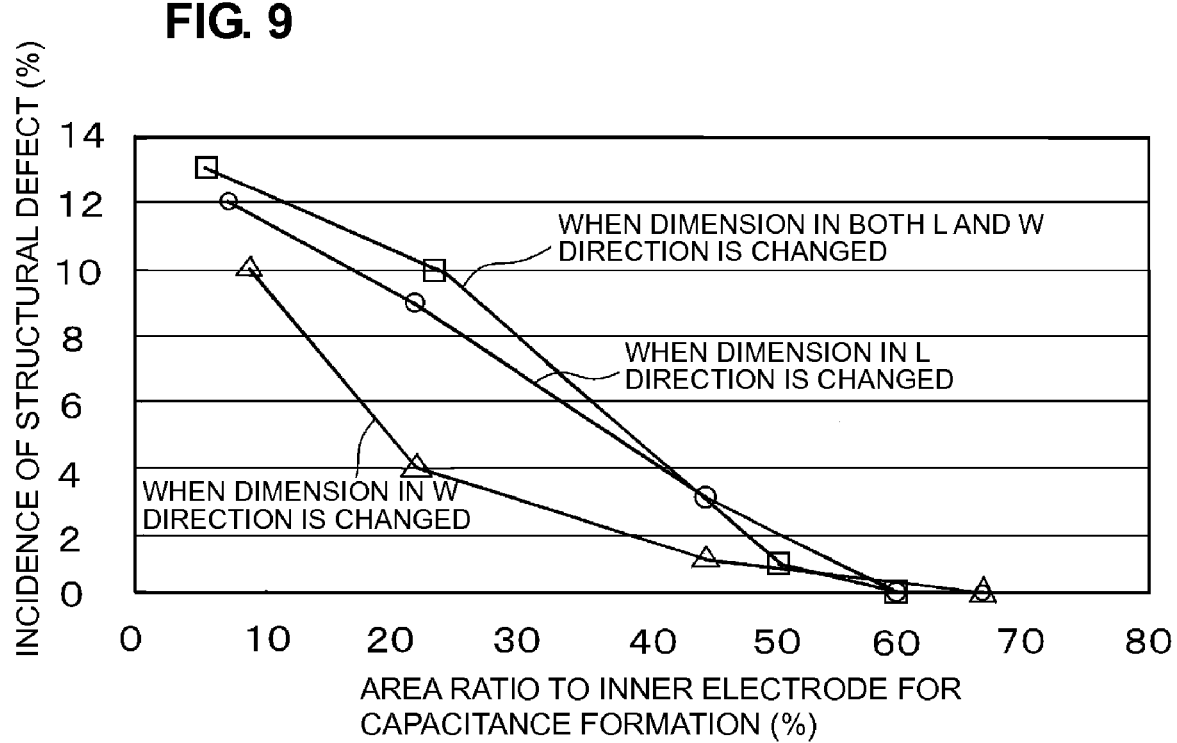
FIG. 9 illustrates the relationship between the plane area of the dummy inner electrode layers in the stress relieving layer (intermediate layer) and the incidence of structural defects.

In Evaluations 15 to 19 shown in Table 3 where the plane area of the dummy inner electrode layers 23 was changed by changing the dimensions in the L direction shown in FIG. 3, structural defects due to both electrostriction (inverse piezoelectric effect) and those due to the contraction difference during firing were able to be prevented when the plane area of the dummy inner electrode layers 23 in a single layer was about 60% or more of that of the capacitance-forming inner electrode layers contributing to the formation of electrostatic capacitance in a single layer (Evaluations 15 and 16). When the plane area of the dummy inner electrode layers 23 was less than about 60% of that of the capacitance-forming inner electrode layers (Evaluations 17, 18, and 19), it was confirmed that structural defects were generated due to the contraction difference during firing (see FIG. 9).

(4) Evaluations 20 to 23

In Evaluations 20 to 23 shown in Table 3 where the plane area of the dummy inner electrode layers was changed by changing the dimensions in the W direction shown in FIG. 3, structural defects due to both electrostriction (inverse piezoelectric effect) and those due to the contraction difference during firing were able to be prevented when the plane area of the dummy inner electrode layers 23 in a single layer was about 60% or more of that of the capacitance-forming inner electrode layers (effective electrode layers) in a single layer (Evaluation 20). When the plane area of the dummy inner electrode layers 23 was less than about 60% of that of the capacitance-forming inner electrode layers (Evaluations 21 to 23) in a single layer, it was confirmed that structural defects were generated due to the contraction difference during firing (see FIG. 9).

(5) Evaluations 24 to 27

Evaluations 24 to 27 shown in Table 4 where the plane area of the dummy inner electrode layers 23 was changed by changing the dimensions in both the L and W directions shown in FIG. 3, structural defects due to electrostriction (inverse piezoelectric effect) and those due to the contraction difference during firing were able to be prevented when the plane area of the dummy inner electrode layers 23 was about 60% or more of that of the capacitance-forming inner electrode layers in a single layer (Evaluation 24). When the plane area of the dummy inner electrode layers 23 was less than about 60% of that of the capacitance-forming inner electrode layers (Evaluations 25 to 27) in a single layer, it was confirmed that structural defects were generated due to the contraction difference during firing (see FIG. 9).

From the evaluations in (3), (4), and (5), i.e., Evaluations 15 to 27 where the plane area of the dummy inner electrode layers 23 was changed by changing the dimensions in one or both of the L and W directions shown in FIG. 3, it was confirmed that structural defects due to electrostriction (inverse piezoelectric effect) and those due to the contraction difference during firing could be prevented when the plane area of the dummy inner electrode layers 23 was about 60% or more of that of the capacitance-forming inner electrode layers, and structural defects were generated due to the contraction difference during firing when the effective area of the dummy inner electrode layers 23 was less than about 60% of plane area of the capacitance-forming inner electrode layers.

(6) Evaluations 28 and 29

Evaluations 28 and 29 shown in FIG. 4 will now be described. The total plane area of two split electrodes, each pair constituting a dummy inner electrode layer 23, in a single layer in Evaluation 28 was equal to the plane area of the undivided dummy inner electrode layers 23 in a single layer in Evaluation 29.

In Evaluation 28, it was confirmed that structural defects due to the inverse piezoelectric effect and those due to the contraction difference during firing were able to be prevented even when the dimensions of the two split electrodes, each pair constituting a dummy inner electrode layer 23, in the L direction shown in FIG. 3 differed from each other (when the split electrodes were asymmetric to each other) as long as the plane area of the dummy inner electrode layers 23 was 60% or more of that of the capacitance-forming inner electrode layers.

In Evaluation 29, only one dummy inner electrode layer 23 was provided in a single layer as shown in FIG. 4 (that is, the dummy inner electrode layers were undivided and the number of divisions was zero). In this case, it was also confirmed that structural defects due to the inverse piezoelectric effect and those due to the contraction difference during firing were able to be prevented as long as the thickness of the intermediate layer and the ratio of the area of the dummy inner electrode layers 23 to the area of the capacitance-forming inner electrode layers satisfied the requirements of the present invention.

(7) Evaluations 30 and 31

Figure 10:
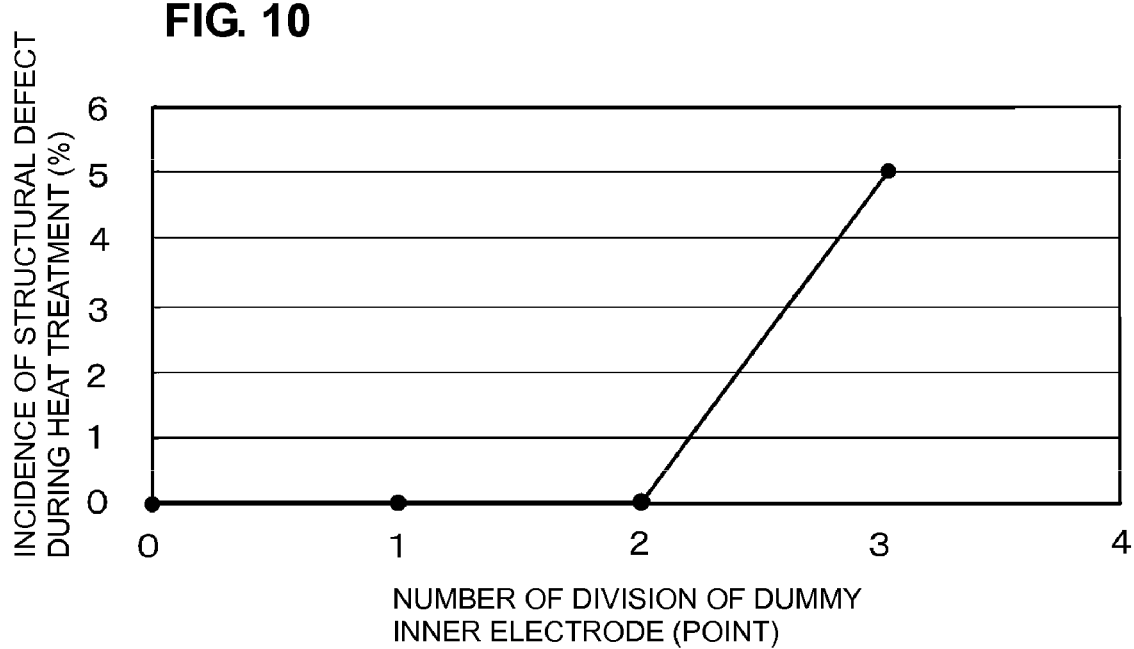
FIG. 10 illustrates the relationship between the number of divisions of the dummy inner electrode layers in the stress relieving layer (intermediate layer) and the incidence of structural defects.
Figure 11:
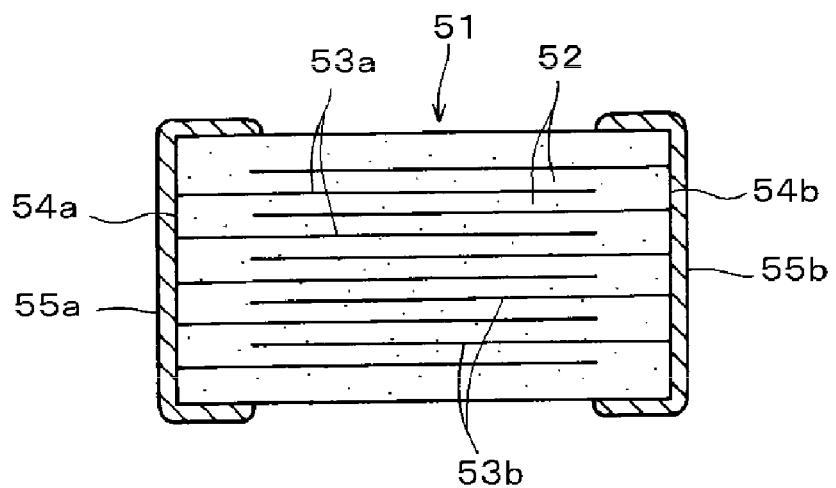
FIG. 11 is a cross-sectional view illustrating the internal structure of a known laminated ceramic capacitor.
Figure 12:
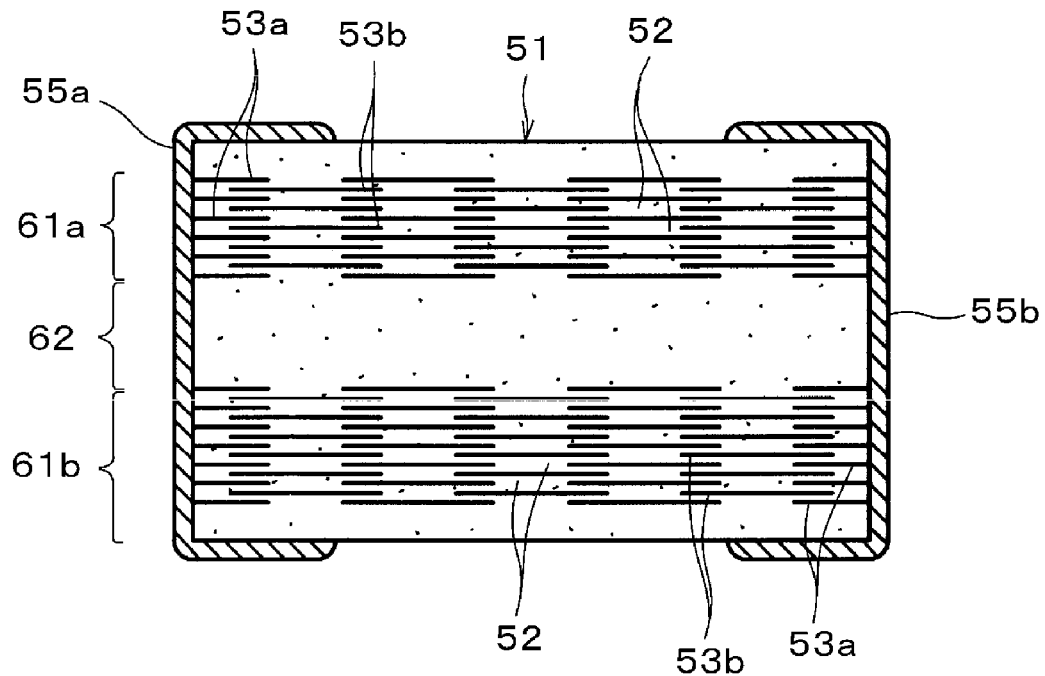
FIG. 12 is a cross-sectional view illustrating the internal structure of another known laminated ceramic capacitor.
Figure 13:
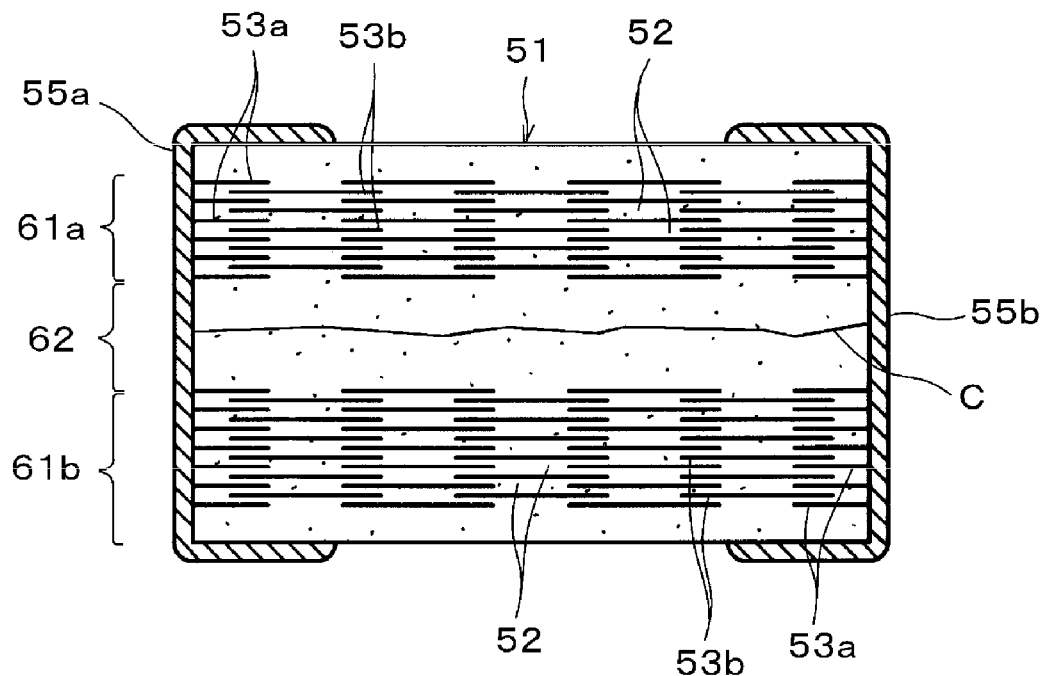
FIG. 13 illustrates a state where a crack is generated in the laminated ceramic capacitor shown in FIG. 12.

The incidence of structural defects when the dummy inner electrode layers 23 were divided into three split electrodes (number of split positions was 2; Evaluation 30) and into four split electrodes (number of split positions was 3; Evaluation 31) in a single layer as shown in FIGS. 5 and 6, respectively, was investigated (the ratio of the plane area of the dummy inner electrode layers to that of the capacitance-forming inner electrode layers was about 90%). As shown in Table 4, it was confirmed that both structural defects due to electrostriction (inverse piezoelectric effect) and those due to the contraction difference during firing were able to be prevented in Evaluation 30 where the dummy inner electrode layers were divided into three. However, as shown in Table 4 and FIG. 10, it was confirmed that structural defects were generated during heat treatment in Evaluation 31 where the dummy inner electrode layers 23 were divided into four. The reasons why structural defects were generated during heat treatment when the dummy inner electrode layers were divided into four are not obvious. However, it can be considered that a contraction difference between the capacitance-forming inner electrode layers and the dummy inner electrode layers occurred since the amount of contraction per dummy inner electrode layer (split electrode) was small as compared with the case where the dummy inner electrode layers were divided into three or less.

The present invention is also not limited to the above-described preferred embodiments in other respects. Various applications and modifications in, for example, the lamination mode and the number of lamination layers constituted by the ceramic dielectric layers and the capacitance-forming inner electrode layers, types of ceramic materials of which the capacitance forming layers and the stress relieving layer are made, specific patterns and arrangements of the capacitance-forming inner electrode layers that contribute to the formation of electrostatic capacitance, the dummy inner electrode layers that do not contribute to the formation of electrostatic capacitance, and the capacitance-formation-preventing inner electrode layers that prevent capacitance from being formed between the capacitance-forming inner electrode layers and the dummy inner electrode layers, the thickness of the stress relieving layer, the ratio of the plane area of the dummy inner electrode layers to that of the capacitance-forming inner electrode layers, and the mode of divisions when the dummy inner electrode layers are divided, are possible within the scope of the present invention.

According to preferred embodiments of the present invention, the thickness of the stress relieving layer is in the range of about 100 μm to about 300 μm inclusive, and the plane area of the dummy inner electrode layers in a single layer is about 60% or more of that of the capacitance-forming inner electrode layers in a single layer. Moreover, the dummy inner electrode layers are undivided or are divided into two or three parts in a single layer. With this, a laminated ceramic capacitor, with a high breakdown voltage and excellent withstand-voltage performance, of which structural defects such as cracks generated during firing or structural defects caused by electrostriction (inverse piezoelectric effect) can be prevented even when a ceramic material with a high dielectric constant is used as a dielectric ceramic and even when the number of lamination layers constituted by the ceramic dielectric layers and the capacitance-forming inner electrode layers is increased can be realized.

Therefore, the present invention is applicable to various laminated ceramic capacitors, and in particular, can be preferably used for laminated ceramic capacitors with large capacity and high withstand voltage (high rated working voltage type) for which a high breakdown voltage and excellent withstand-voltage performance are required.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A laminated ceramic capacitor comprising:
    at least two capacitance forming layers in which at least one ceramic dielectric layer and capacitance-forming inner electrode layers that contribute to the formation of electrostatic capacitance are laminated;
    at least one stress relieving layer in which ceramic dielectric layers and at least one dummy inner electrode layer that does not contribute to the formation of electrostatic capacitance are laminated, the stress relieving layer being disposed between two adjacent capacitance forming layers so as to relieve stress caused by electrostriction in the capacitance forming layers; and
    capacitance-formation-preventing inner electrode layers that prevent capacitance from being formed between the capacitance-forming inner electrode layers and the dummy inner electrode layer, each of the capacitance-formation-preventing inner electrode layers being disposed between each of the capacitance forming layers and the stress relieving layer; wherein
    a thickness of the stress relieving layer is in the range of about 100 μm to about 300 μm inclusive;

a plane area of the dummy inner electrode layer in a single layer is about 60% or more of a plane area of the capacitance-forming inner electrode layer in a single layer; and the dummy inner electrode layer is undivided or is divided into at least two parts in a single layer.

2. The laminated ceramic capacitor according to claim 1, wherein the ceramic dielectric material of which the stress relieving layer is made is the same ceramic dielectric material as the ceramic dielectric material of which the capacitance forming layers are made.

* * * * *